(12) United States Patent
Hobson et al.

(10) Patent No.: US 10,540,449 B2
(45) Date of Patent: Jan. 21, 2020

(54) IN-CONTEXT TRANSLATION REVIEW

(71) Applicant: Oath Inc., New York, NY (US)

(72) Inventors: Jay Anthony Hobson, Fremont, CA (US); Jee Seon Yi, Sunnyvale, CA (US); Itsik Figenblat, Studio City, CA (US); Daryl Low, San Jose, CA (US)

(73) Assignee: Oath Inc., New York, NY (US)

( * ) Notice: Subject to any disclaimer, the term of this patent is extended or adjusted under 35 U.S.C. 154(b) by 122 days.

(21) Appl. No.: 14/860,919

(22) Filed: Sep. 22, 2015

(65) Prior Publication Data

US 2017/0083514 A1   Mar. 23, 2017

(51) Int. Cl.
*G06F 3/00* (2006.01)
*G06F 17/28* (2006.01)

(52) U.S. Cl.
CPC .............. *G06F 17/2854* (2013.01)

(58) Field of Classification Search
CPC ............ G06F 17/2854; G06F 17/2836
See application file for complete search history.

(56) References Cited

U.S. PATENT DOCUMENTS

| | | | | |
|---|---|---|---|---|
| 6,792,595 B1* | 9/2004 | Storistenau | ............... | G06F 8/33 345/650 |
| 8,429,528 B2* | 4/2013 | March, Jr. | ............... | G06F 17/24 705/300 |
| 2008/0313260 A1* | 12/2008 | Sweet | ............... | G06F 17/3089 709/201 |
| 2013/0054736 A1* | 2/2013 | Hunt | ............... | G06F 9/45533 709/217 |
| 2015/0234811 A1* | 8/2015 | Bareket | ............... | G06F 17/289 704/2 |
| 2015/0378989 A1* | 12/2015 | Wu | ............... | G06F 17/289 704/3 |
| 2016/0162166 A1* | 6/2016 | Kleine-Horst | ...... | G06F 3/04847 715/703 |

* cited by examiner

*Primary Examiner* — Kyle R Stork
(74) *Attorney, Agent, or Firm* — Cooper Legal Group, LLC

(57) ABSTRACT

As provided herein, a translated string, received from a translator for an application (e.g., an instrumented application) may be identified. The translated string may be identified based upon the translated string being associated with a service call instruction for the application. A simulated instrumented application may be generated for testing the application. The simulated instrumented application may be generated to comprise the translated string integrated into the application. The simulated instrumented application may comprise an element corresponding to the translated string. A user interface may be generated. The user interface may comprise the simulated instrumented application, the translated string visually associated with the element, and an editing functionality to edit the translated string.

20 Claims, 9 Drawing Sheets

IN-CONTEXT TRANSLATION REVIEW

BACKGROUND

An application developer may desire to create an application that can be accessible to users from all over the world (e.g., available to users that speak various languages). For example, to allow a user who speaks German to utilize the application developed in English, the application may be translated into German. A translator may translate an original string (e.g., corresponding to an original element of the application, such as a text string or a textbox user interface element), to generate a translated string. A reviewer may review the translated string to determine whether a translated element, corresponding to the translated string, fits within a space allotted for an original element corresponding to the original string (e.g., whether the translated textbox user interface element visually occludes other user interface elements due to an increased size resulting from the translated textbox user interface element being populated with the German translated string). The reviewer may also determine whether the translated string makes contextual sense in relation to other elements near the translated element. Unfortunately, identifying a translated string from a multitude of strings present in the application may be time consuming. Further, the reviewer may have difficulty identifying the translated element corresponding to the translated string and determining where the translated element should be placed within a user interface form of the application.

SUMMARY

In accordance with the present disclosure, one or more client devices, systems, and/or methods for in-context translation review are provided. In an example, a translated string and/or a second translated string, received from a translator for an application, may be identified based upon the translated string being associated with a service call instruction for the application and/or the second translated string being associated with a second service call instruction for the application. A simulated instrumented application and/or an instrumented application (e.g., comprising the application running on a second client device), for testing of the application (e.g., an instrumented application), may be generated. The instrumented application may function in same or similar manner as the simulated instrumented application. The simulated instrumented application may comprise an element corresponding to the translated string (e.g., a button user interface comprising the translated string) and/or a second element corresponding to the second translated string (e.g., a textbox comprising the second translated string). The simulated instrumented application may simulate the translated string and/or the second translated string integrated into the application. A user interface may be generated. The user interface may comprise the simulated instrumented application, the translated string visually associated with the element, the second translated string visually associated with the second element, and/or an editing functionality to edit the translated string and/or the second translated string. In this way, a reviewer may easily identify elements comprising translated strings within the simulated instrumented application for review (e.g., determining whether user interface elements, comprising translated strings, fit appropriately within a user interface, do not visually occlude other user interface elements, are contextually appropriate, and/or are correctly sized).

Responsive to the reviewer, such as a user, interacting with the translated string (e.g., hovering over or selecting a user interface element populated with the translated string), the element may be highlighted (e.g., presented in a different color than other elements, presented in a bolder font than other elements, etc.). Responsive to the user selecting the translated string, the translated string, but not the second translated string, and the simulated instrumented application, comprising the element, may be presented to the user in a window (e.g., the user may be visually focused into the element for review). Responsive to the user utilizing the editing functionality to alter the translated string, an altered simulated instrumented application, comprising an altered element corresponding to the alteration of the translated string, may be presented to the user in real time. In this way, the user may easily identify and/or modify user interface elements and/or translated strings.

Responsive to the user reviewing the second translated string, an indication may be presented to the user that the second translated string has been reviewed. Responsive to the translated string and the second translated string being reviewed, an integration component may receive a request for the translated string and/or the second translated string to be integrated into the application to generate a reviewed application.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
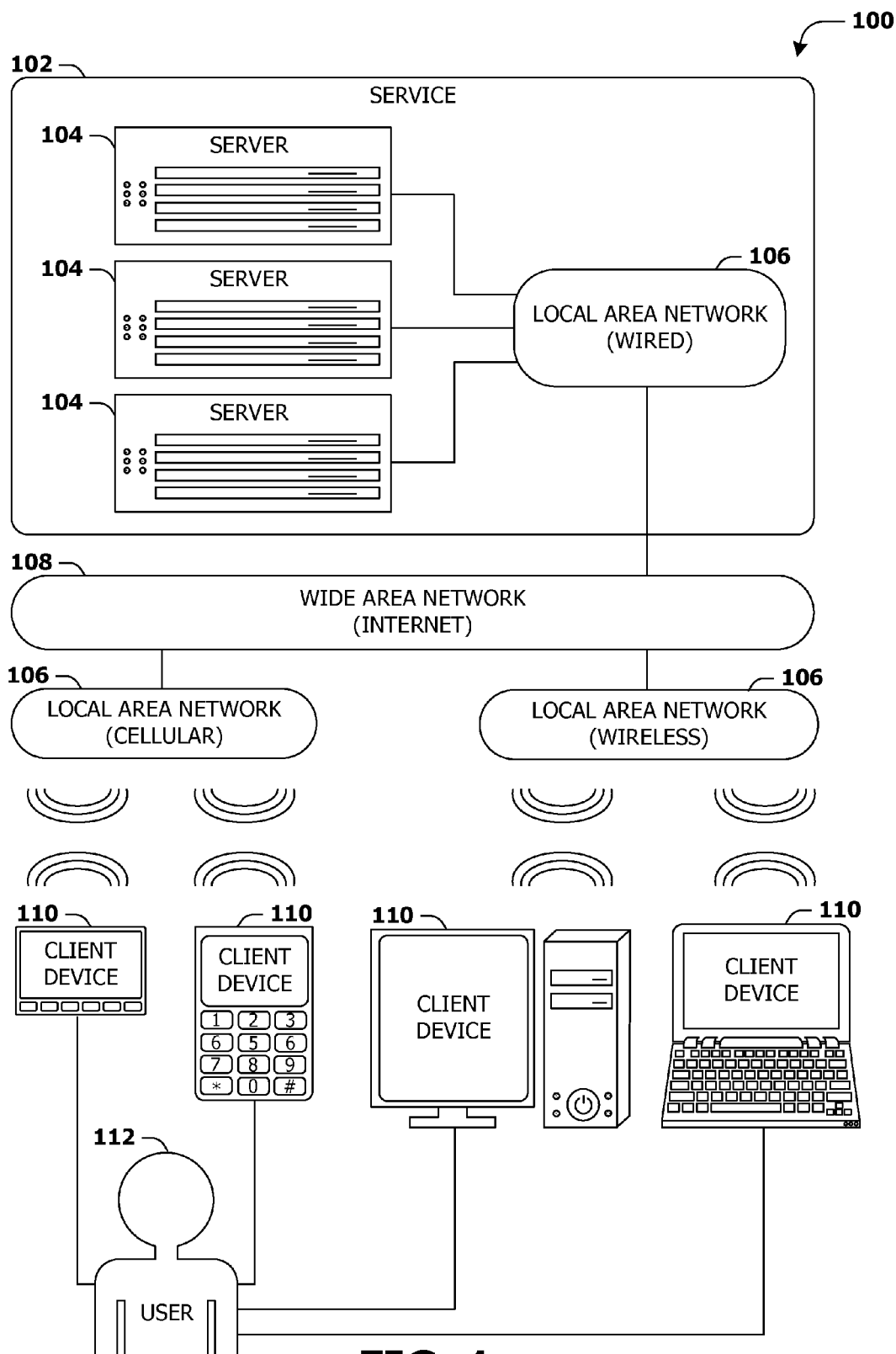
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fibre Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi network or a Bluetooth personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
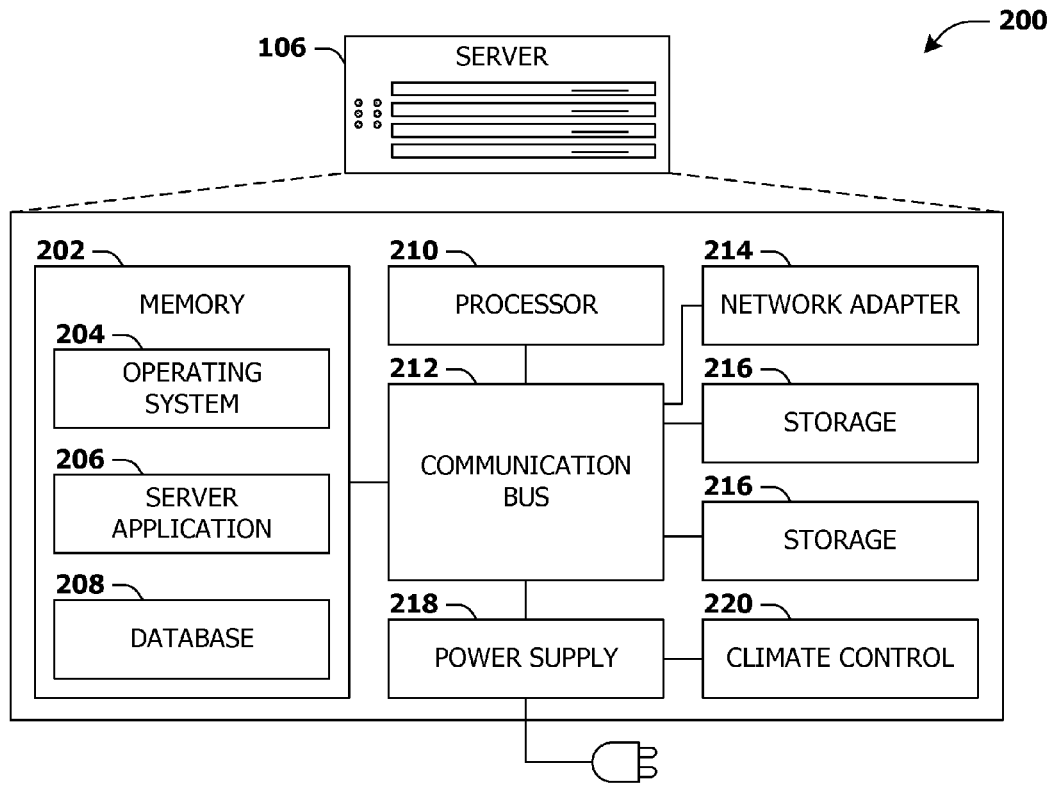
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
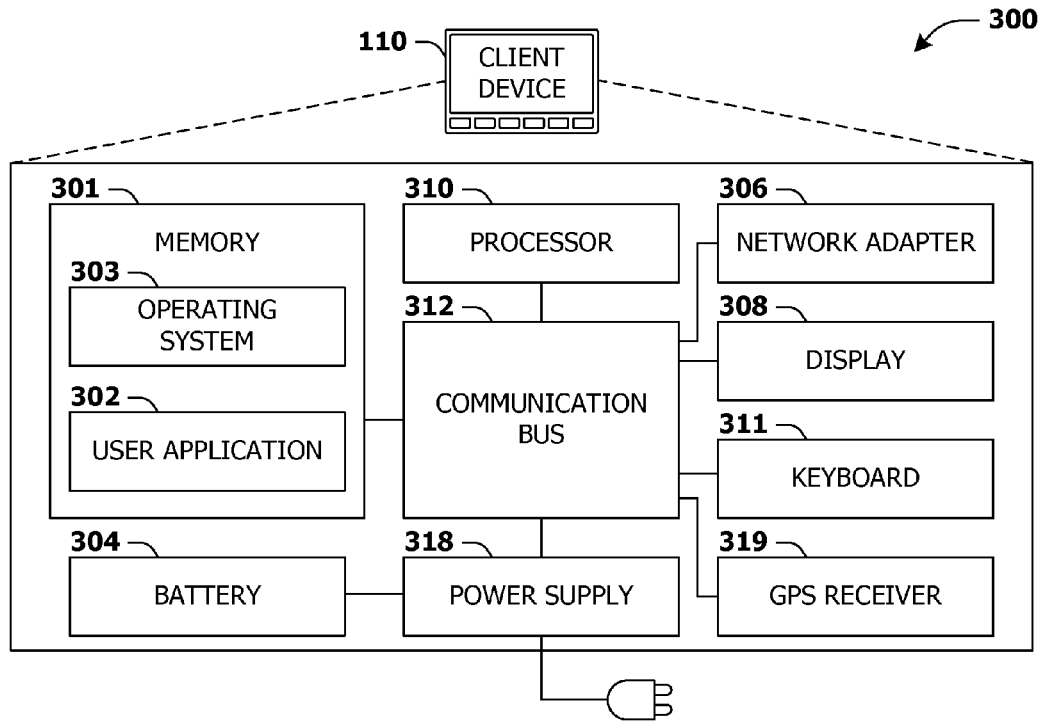
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, median applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more client devices, systems, and/or techniques for in-context translation review are provided. One or more translated strings, for an application (e.g., an instrumented application), may be provided to a review component (e.g., in response to a request to a server for a translated string). The review component may identify the one or more translated strings based upon the translated strings being associated with one or more service call instructions (e.g., instructions to integrate the one or more service calls into the application). In an example, a library component (e.g., an in-context library) may identify the one or more translated strings and format information about the one or more translated strings before integrating the one more translated strings into the application. A continuous integration component may generate a simulated instrumented application comprising one or more elements corresponding to the one or more translated strings. The simulated instrumented application may be used to test how the application may appear and/or function with the one or more translated strings (e.g., how a textbox, with a German translated string, will appear within an application user interface of the application).

A user interface, comprising the simulated instrumented application and the one or more translated strings visually associated with the one or more elements, may be generated so that a user, such as a reviewer, may review and/or edit the translated stings and/or elements (e.g., the textbox or other user interface elements) through the user interface. In an example, the format information may be utilized to visually associate the one or more elements with the one or more translated strings. In this way, the user may be presented with the user interface. Responsive to the reviewer altering a translated string, an element, corresponding to the translated string on the simulated instrumented application, may be altered in real time (e.g., the user may edit the German translated string within the textbox). The real time alteration of the simulated instrumented application may increase reviewer quality by decreasing a number of incorrect and/or size inappropriate elements integrated into the application (e.g., because the reviewer may quickly notice that the element is too large, too small to display the entire German translated string, overlaps another element, is in an incorrect position, is contextually incorrect relative to another element, etc.). The ability to identify the one or more translated strings and visually link them to their corresponding elements on the simulated instrumented application may increase reviewer efficiency by decreasing an amount of time the reviewer uses searching for translated strings for review and/or determining which elements of the application correspond to which translated strings.

Figure 4A:
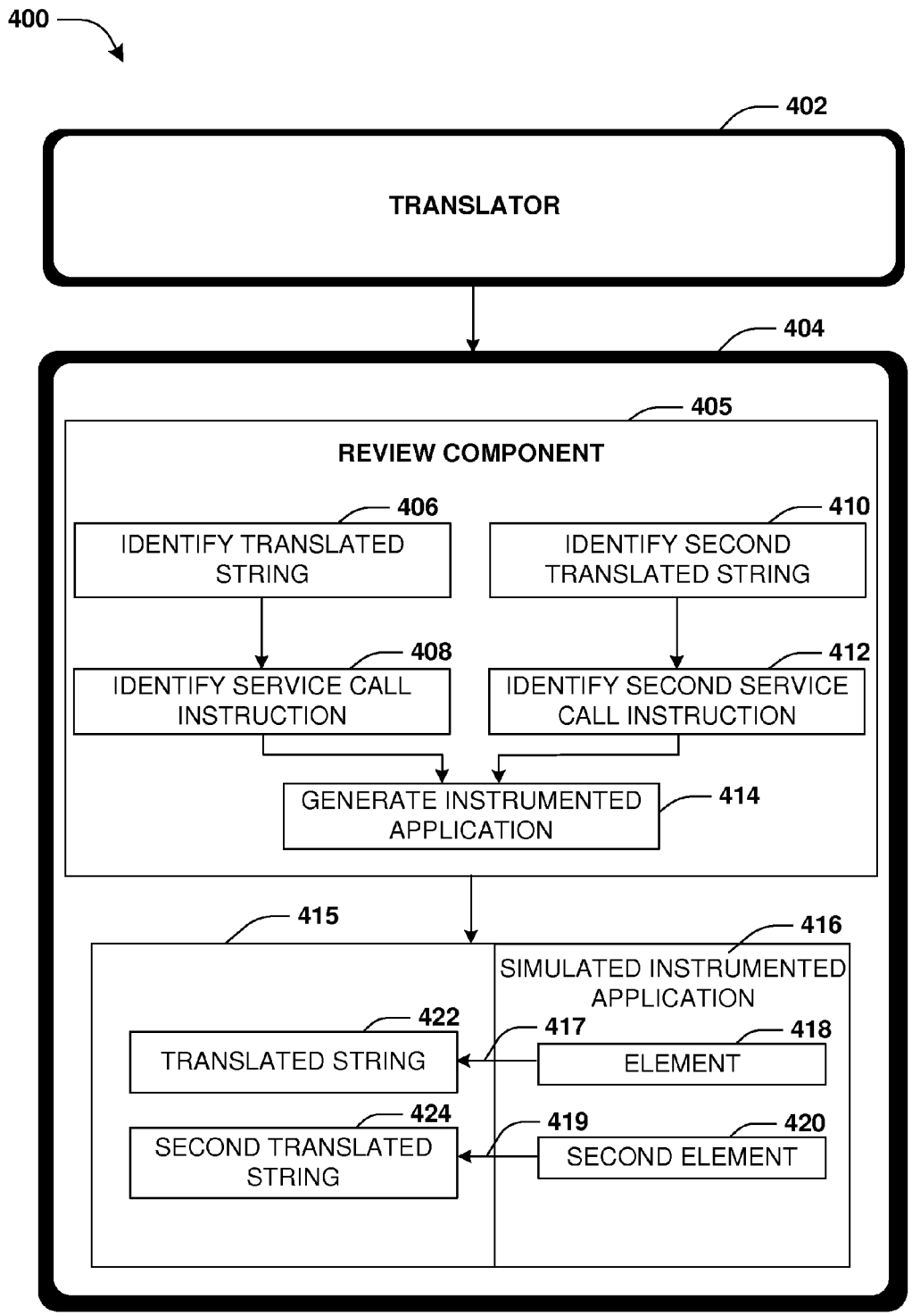
FIG. 4A is a component block diagram illustrating an example system for in-context translation review, where a user interface, comprising a translated string and a second translated string, is generated.
Figure 4B:
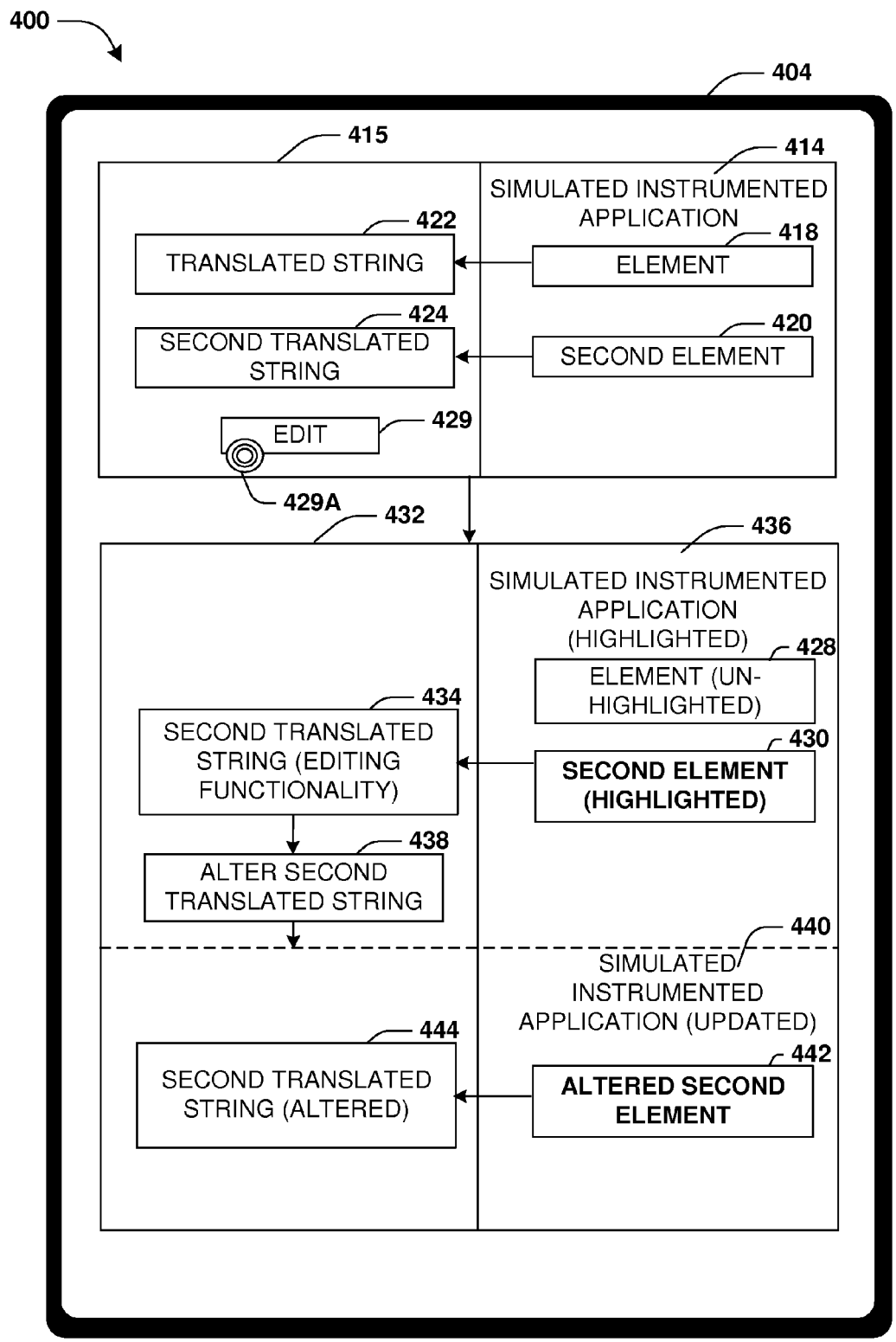
FIG. 4B is a component block diagram illustrating an example system for in-context translation review, where a second translated string is altered.
Figure 4C:
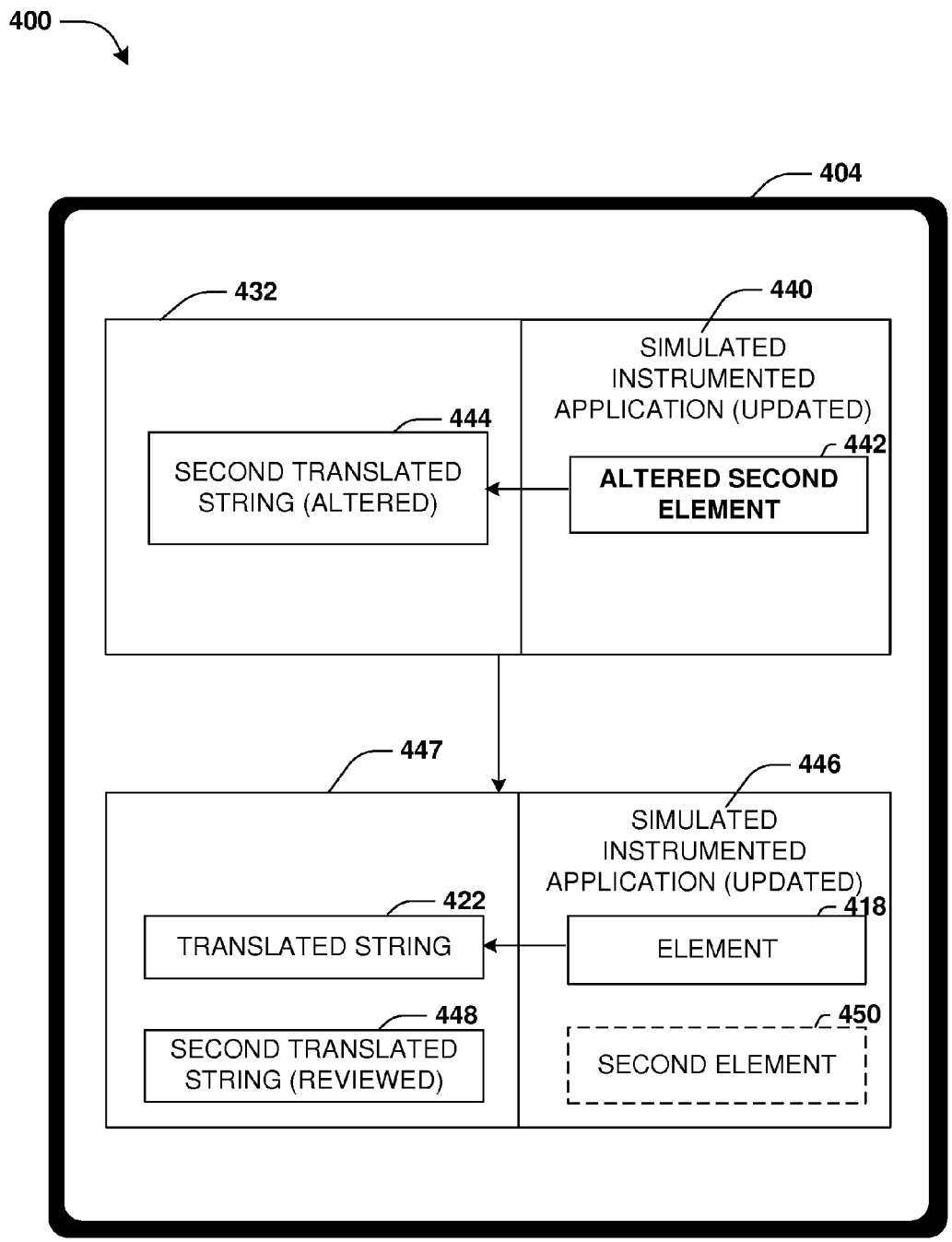
FIG. 4C is a component block diagram illustrating an example system for in-context translation review, where a second translated string is reviewed.

FIGS. 4A-4C illustrate an example system 400 for in-context translation review utilizing a review component 405 of a client device 404. A translator 402 may generate a translated string 422, a second translated string 424, and/or any other number of translated strings for an application (e.g., strings of the application, such as a mobile application, a webpage, a browser, etc., translated from English to Chinese). In an example, the application may contain one or more translated strings and/or may be overridden by one or more stored translated strings stored in a database 208, as illustrated in FIG. 2, (e.g., where the one or more stored translated strings may have been reviewed more recently relative to the one or more translated strings). The application may make a request via a server 104, a WAN 108, and/or a LAN 106, as illustrated in FIG. 1, to retrieve a stored translated string, such that a future service call requesting the stored translated string may display a most current translated string. The client device 404 may receive the translated string 422 and/or the second translated string 424 (e.g., from the database 208, the translator 402, etc.). The review component 405 may identify 406 the translated string 422 based upon a service call instruction 408 (e.g., an instruction to integrate the translated string 422 into the application) associated with the translated string 422. The review component 405 may identify 410 the second translated string 424 based upon a second service call instruction 412 associated with the second translated string 424. A library component, associated with the review component 405, may maintain a record of the translated string 422 and associated format information (e.g., a location of an element 418, corresponding to the translated string 422, within a user interface form of the application) and/or the second translated string 424 and second associated format information (e.g., a second location of a second element 420, corresponding to the second translated string 424, within the user interface form of the application).

The review component 405 may generate 414 a simulated instrumented application 416 and/or an instrumented application (e.g., the application running on a second client device). The simulated instrumented application 416 may be generated by a continuous integration component by integrating the translated string 422, the second translated string 424, and/or other translated strings into the application. The simulated instrumented application 416 may be utilized for testing the application (e.g., a reviewer may visually identify, evaluate, and/or modify elements populated with translated strings). The review component 405 may identify the element 418 of the simulated instrumented application 416 as corresponding to the translated string 422, and/or the second element 420 of the simulated instrumented application 416 as corresponding to the second translated string 424 (e.g., utilizing an in-context library). The instrumented application may function in a same or similar manner as the simulated instrumented application 416. The review component 405 may visually emphasize and/or provide indicators that the element 418 and/or the second element 420 correspond to translated strings, while other elements may be emphasized and/or may be deemphasized so that a review may easily identify user interface elements having translated strings. The review component 405 may utilize the record from the library component to identify the element 418 (e.g., based upon the associated format information) as being associated with the translated string 422 and/or the second element 420 (e.g., based upon the second associated format information) as being associated with the second translated string 424. The review component 405 may generate a user interface 415. The user interface 415 may comprise the simulated instrumented application 416, the translated string 422 visually associated 417 with the element 418, and/or the second translated string 424 visually associated 419 with the second element 420.

FIG. 4B illustrates the example system 400 facilitating alteration of the second translated string 424. In an example, a user (e.g., a reviewer of the translated string 422 and the second translated string 424) may select 429A an edit option 429 associated with the second translated string 424. For example, the user may select 429a the edit option 429 based upon the second element 420 being incorrect (e.g., a translation of "address" from English to Russian used a verb form of a word, where a noun form of the word should have been used, a context of the second element 420 is incorrect relative to other elements, etc.), the second element 420 exceeding a space allotted for an original element (e.g., when a string within the second element 420 is translated from English to Russian, a size of the second element 420 is increased to accommodate for a larger Russian string, and thus the second element 402 may now visually overlap another user interface element), and/or is sized and/or located in a location that overlaps other user interface elements.

In an example, responsive to the user selecting 429A the edit option 429, the user interface 415 may display a second page 432. The second page 432 may display the second translated string 424 in a field having an editing functionality, resulting in an editable second translated string 434. The simulated instrumented application 436 may highlight the second element 420 (e.g., corresponding to the editable second translated string 434), resulting in a highlighted second element 430. For example, the highlighted second element 430 may be highlighted by displaying the highlighted second element 430 in a color that is different from the element 428 (e.g., the element 428 may be un-highlighted), a text characteristic of the highlighted second element 430 may be altered (e.g., italicized, bolded, underlined, etc.), the highlighted second element 430 may be outlined, etc. The user may alter 438 the editable second translated string 434 utilizing the editing functionality. In an example, the user may rebuild the editable second translated string 434. For example, the user may alter 438 a formatted string comprising a variable placeholder, such that the alteration 438 may be propagated through variables represented by the variable placeholder.

Responsive to the user altering 438 the editable second translated string 434 to create an altered second translated string 444, the simulated instrumented application 436 may be updated to display an altered second element 442 comprising the altered second translated string 444, thus resulting in an updated simulated instrumented application 440. The altered second element 442 may be altered in real time based upon the alteration 438 resulting in the altered second translated string 444. In this way, the user may determine whether the altered second element 442 is contextually correct, physically fits into the allotted space for the original element, and/or is sized and/or located in a location that does not overlap other user interface elements.

FIG. 4C illustrates the example system 400 indicating that the second translated string 424, as illustrated in FIG. 4B, has been altered to the altered second translated string 444, and thus has been reviewed. For example, responsive to the user determining that the altered second element 442, corresponding to the altered second translated string 444, is contextually correct, physically fits into the allotted space for the original element, and/or is sized and/or located in a location that does not overlap other user interface elements, the user may mark the altered second translated string 444 as reviewed, thus resulting in a reviewed second translated string 448. An updated user interface 447 may be generated based upon the user indicating that the reviewed second translated string 448 has been reviewed and/or approved. The updated user interface 447 may comprise a new updated simulated instrumented application 446 having been updated to comprise the element 418, comprising the translated string 422, and an updated second element 450 comprising the reviewed second translated string 448, where the updated second element 450 has been deemphasized because the reviewed second translated string 448 has already been reviewed. In an example, the translated string 422 may remain visually associated with the element 418, while the reviewed second translated string 448 may not be visually associated with the updated second element 450 because the reviewed second translated string 448 has already been reviewed. In this way, the user may easily identify one or more translated strings (e.g., the translated string 422) that may require review.

Figure 5:
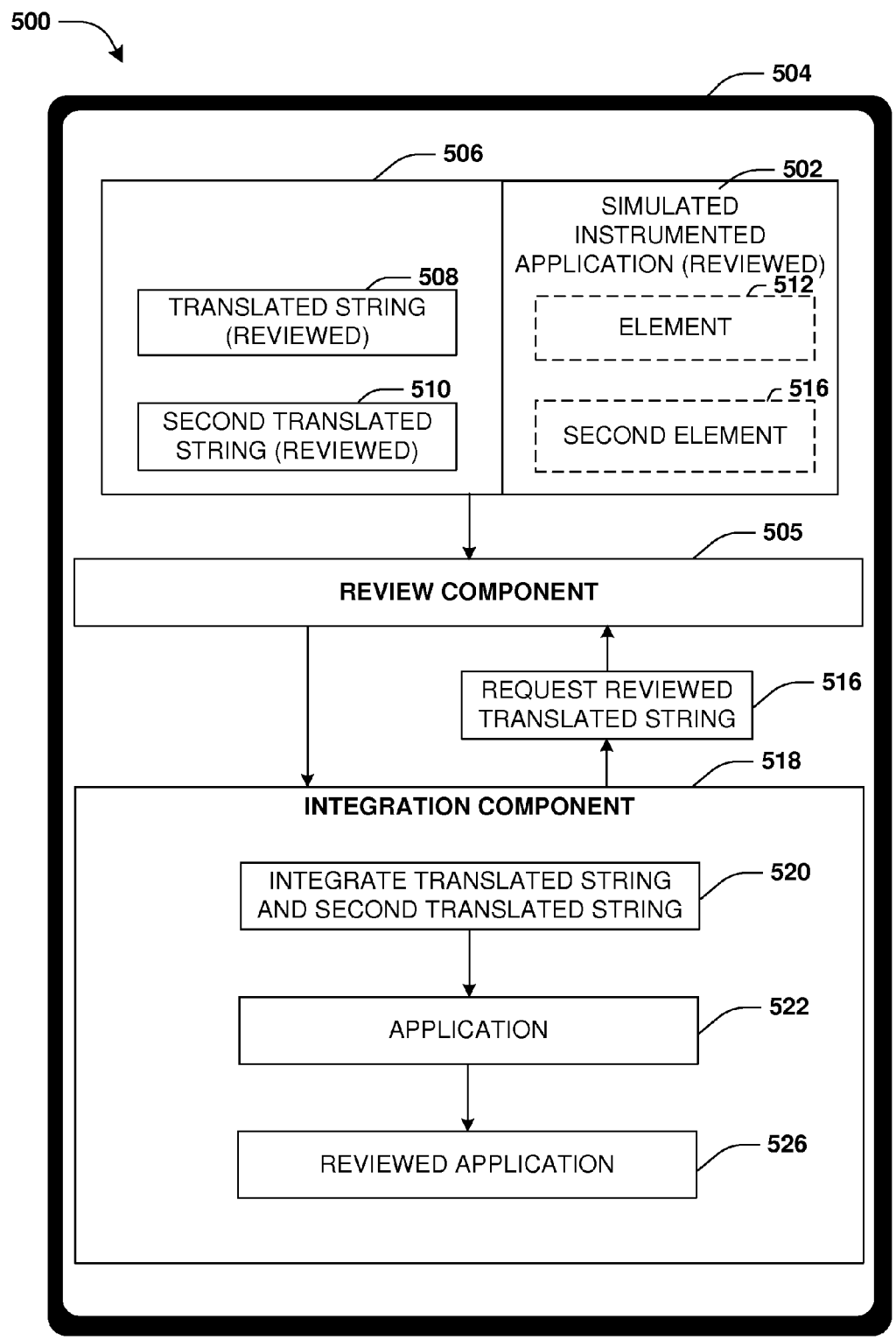
FIG. 5 is a component block diagram illustrating an example system for in-context translation review, where a translated string and a second translated string are integrated into an application.

FIG. 5 illustrates an example system 500 for integrating a translated string 508 and/or a second translated string 510, having been reviewed by a user, into an application 522. A user interface 506, comprising the translated string 508, the second translated string 510, and a simulated instrumented application 502, may be generated. The simulated instrumented application 502 may comprise an element 512, corresponding to the translated string 508, and a second element 516 corresponding to the second translated string 510. The element 512 and/or the second element 516 may be deemphasized based upon the translated string 508 and/or the second translated string 510 being indicated as reviewed by the user.

Responsive to one or more translated strings (e.g., the translated string 508 and the second translated string 510) having been reviewed, the user interface 506 may provide one or more reviewed translated strings to a review component 505 (e.g., comprising a database). The review component 505 may store the translated string 508 and/or the second translated string 510. The review component 505 may receive a request for reviewed translated strings 516 from an integration component 518. The review component 505 may provide the translated string 508 and/or the second translated string 510 to the integration component 518. The integration component may integrate the translated string 508 and/or the second translated string 510 into the application 522 to generate a reviewed application 526. In an example, the review component 505 may generate an instruction, for the integration component 518, to integrate 520 the translated string 508 and/or the second translated string 510 into the application 522 to generate the reviewed application 526.

Figure 6:
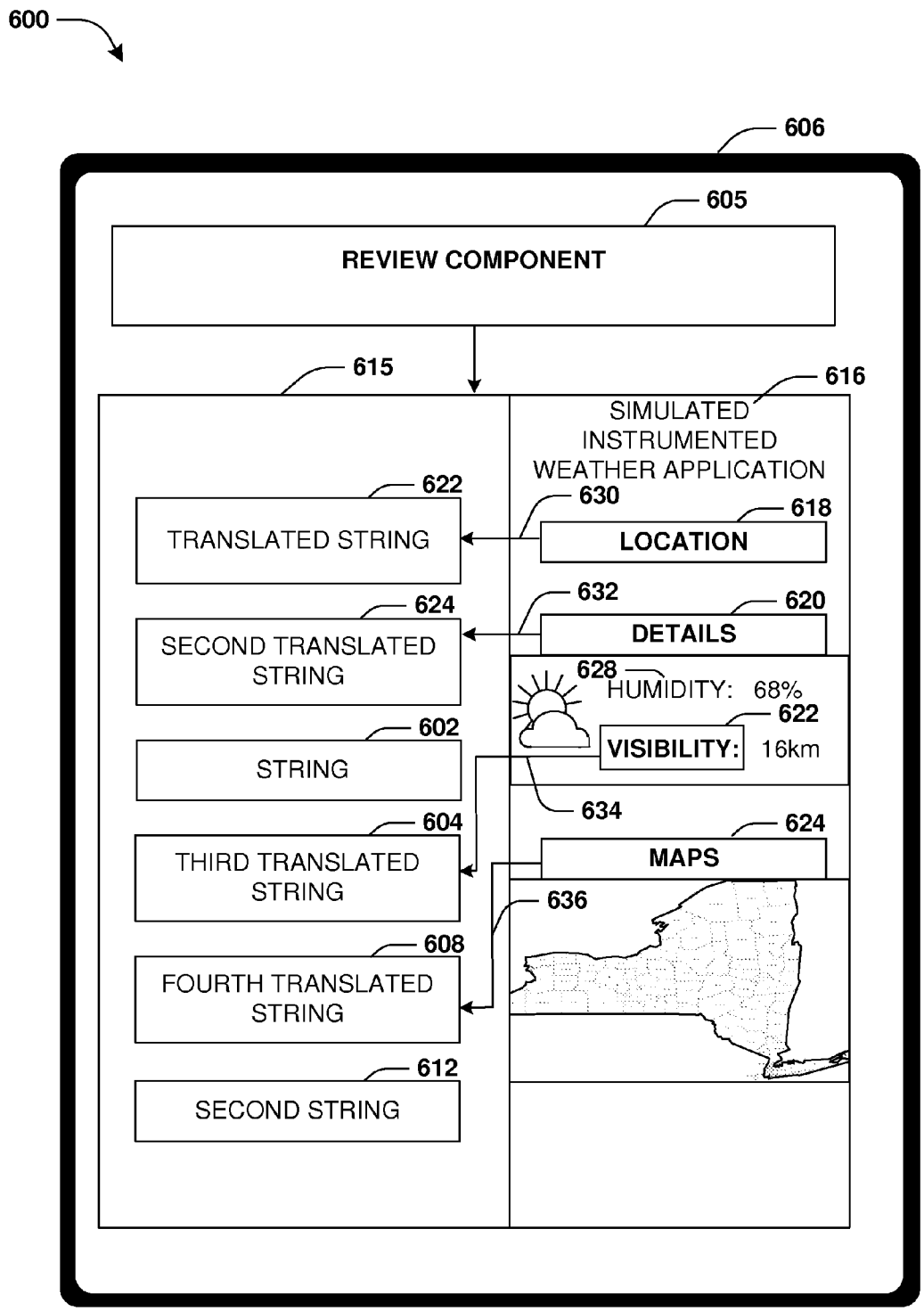
FIG. 6 is a component block diagram illustrating an example system for in-context translation review, where an example user interface is presented.

FIG. 6 illustrates an example system 600 for in-context translation review utilizing a review component 605. A client device 606 may comprise the review component 605. The review component 605 may identify a translated string 622, a second translated string 624, a third translated string 604, and/or a fourth translated string 608 for an application. The review component 605 may generate a simulated instrumented weather application 616 based upon a weather application (e.g., an instrumented weather application). The review component 605 may identify an element 618 (e.g., a location label) corresponding to the translated string 622, a second element 620 (e.g., a details label) corresponding to the second translated string 624, a third element 622 (e.g., a visibility label) corresponding to the third translated string 604, and/or a fourth element 624 (e.g., a maps interface) corresponding to the fourth translated string 608.

The review component 605 may generate a user interface 615. The user interface 615 may comprise the simulated instrumented weather application 616, the translated string 622 visually associated 630 with the element 618, the second translated string 624 visually associated 632 with the second element 620, the third translated string 604 visually associated 634 with the third element 622, and/or the fourth translated string 608 visually associated 636 with the fourth element 624. The simulated instrumented weather application 616 may emphasize the element 618, the second element 620, the third element 622, and/or the fourth element 624 while other elements not corresponding to translated strings 622, 624, 604, 608, may not be emphasized. In an example, the user interface 615 may comprise one or more strings (e.g. a string 602 and/or a second string 612) that have not been translated. Thus, elements, on the simulated instrumented weather application 616, corresponding to the string 602 and/or the second string 612 may not be emphasized. For example, Humidity 628 may comprise an element that is not emphasized, based upon humidity 628 corresponding to a non-translated string (e.g., the string 602). In another example, the string 602 may be properly externalized. Based upon the string 602 not comprising a current translated string (e.g., the string 602 may have been previously translated, the string 602 may not have been translated yet, etc.), the string 602 may appear the same in the simulated instrumented weather application 616 as in the weather application.

Figure 7:
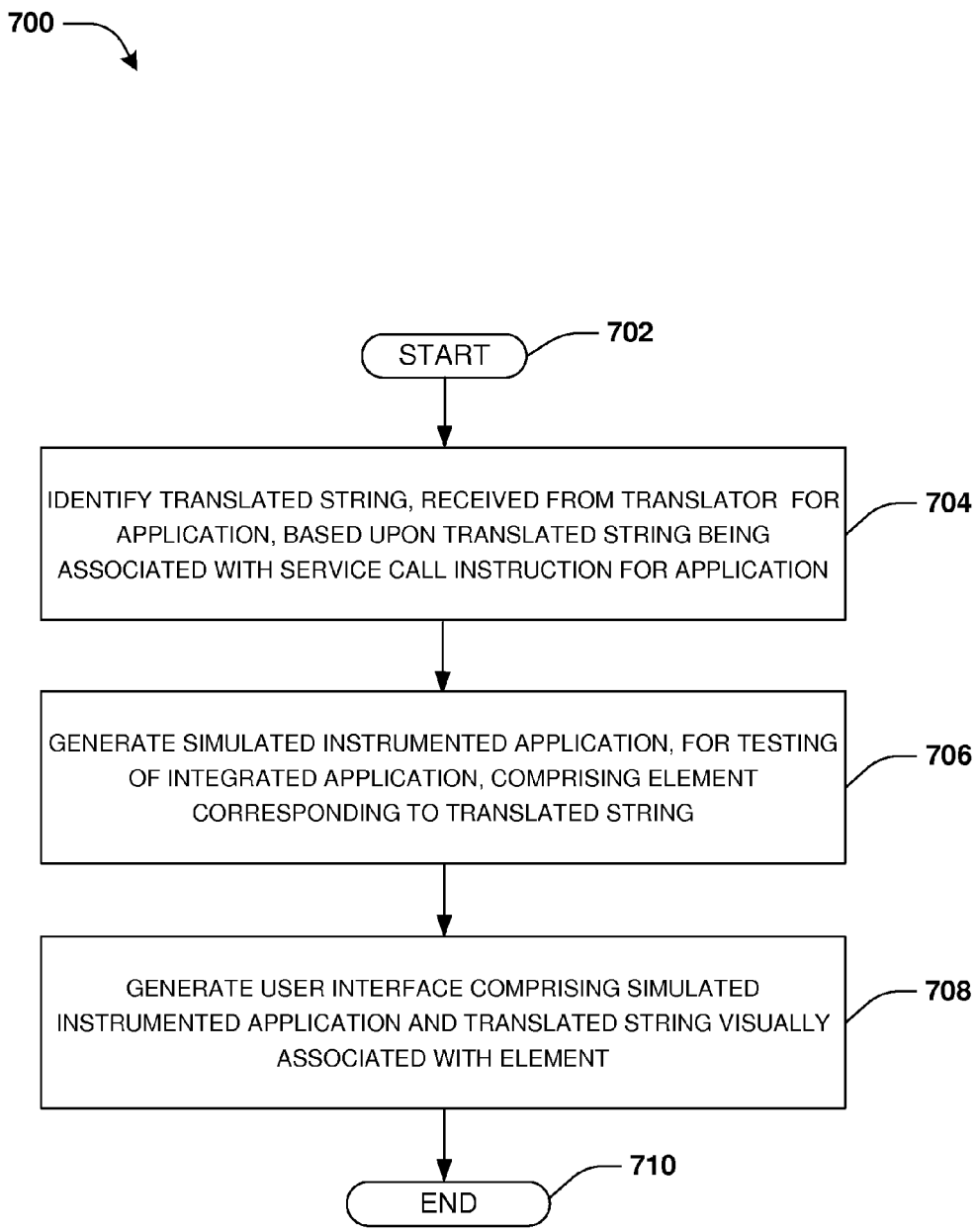
FIG. 7 is a flow chart illustrating an example method for in-context translation review.

An embodiment of in-context translation review is illustrated by an example method 700 of FIG. 7. At 702, the method 700 starts. At 704, a translated string, received from a translator for an application, may be identified based upon the translated string being associated with a service call instruction for the application. In an example, the translated string may be retrieved from a database. At 706, a simulated instrumented application may be generated for testing of the application. The simulated instrumented application may be based upon the application (e.g., an instrumented application) comprising the translated string. The simulated instrumented application may comprise an element corresponding to the translated string. The translated string may be associated with a translation task (e.g., using a resource identification of the translated string and a list of one or more translated strings on a translation task list). The translated string may be associated with a user interface label utilized to display the translated string (e.g., by tracking a translated string content of the translated string and/or a translated string memory location of the translated string). At 708, a user interface may be generated. The user interface may comprise the simulated instrumented application, the translated string visually associated with the element, and/or an editing functionality (e.g., to edit the translated string). In an example, the translated string may receive a visual highlighting to indicate the translated string requires review. In another example, responsive to a user (e.g., a reviewer) selecting the translated string to review, the visual highlighting may alter to emphasize the element relative to a second element. At 710, the method 700 ends.

Figure 8:
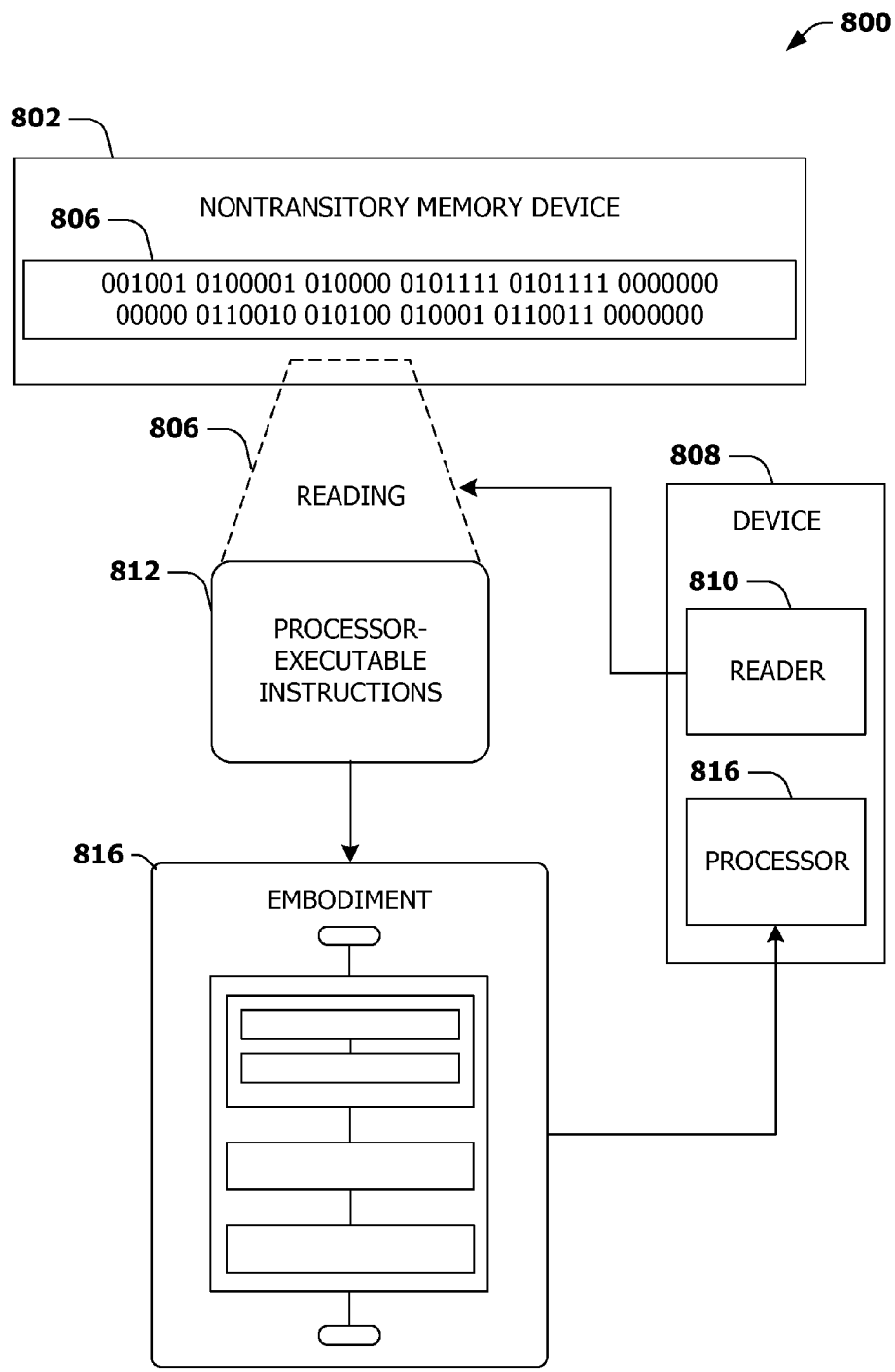
FIG. 8 is an illustration of a scenario featuring an example nontransitory memory device in accordance with one or more of the provisions set forth herein.

FIG. 8 is an illustration of a scenario 800 involving an example nontransitory memory device 802. The nontransitory memory device 802 may comprise instructions that when executed perform at least some of the provisions herein. The nontransitory memory device may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD, DVD, or floppy disk). The example nontransitory memory device 802 stores computer-readable data 804 that, when subjected to reading 806 by a reader 810 of a device 808 (e.g., a read head of a hard disk drive, or a read operation invoked on a solid-state storage device), express processor-executable instructions 812. In some embodiments, the processor-executable instructions, when executed on a processor 816 of the device 808, are configured to perform a method, such as at least some of the example 700 of FIG. 7, for example. In some embodiments, the processor-executable instructions, when executed on the processor 816 of the device 808, are configured to implement a system, such as at least some of the example system 400 of FIGS. 4A-4C, at least some of the example system 500 of FIG. 5, and/or at least some of the example system 600 of FIG. 6, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A client device for in-context translation review, the client device comprising:
    a processor;
    a display; and
    a memory storing instructions that, when executed on the processor, provide a review component configured to:
        identify a string of an element of an application;
        identify a second string of a second element of the application;
        generate and send, via a network connection, a request to access a translation of the string and a second translation of the second string;
        in response to the request, receive a translated string associated with the string and a second translated string associated with the second string from a translator for the application;
        identify the translated string based upon the translated string being associated with a service call instruction for the application, wherein the service call instruction comprises an instruction to integrate the translated string into the application;
        identify the second translated string based upon the second translated string being associated with a second service call instruction for the application, wherein the second service call instruction comprises an instruction to integrate the second translated string into the application;
        identify, in data records, format information associated with the element and second format information associated with the second element;
        generate a simulated instrumented application, for testing of the application, comprising the element and the second element, the simulated instrumented application comprising a representation of the translated string corresponding to the format information and a second representation of the second translated string corresponding to the second format information integrated into the application; and
        control a graphical user interface to concurrently display:
            the simulated instrumented application;
            an editable representation of the translated string visually associated with the element; and
            a second representation of the second translated string visually associated with the second element, wherein the element in the simulated instrumented application is highlighted by displaying the element in a first color associated with editable representations based upon the element being associated with the editable representation while the second element in the simulated instrumented application is not highlighted and is displayed in a second color, associated with non-editable representations, different than the first color.

2. The client device of claim 1, the review component configured to:
    generate the graphical user interface to comprise an editing functionality.

3. The client device of claim 2, the review component configured to:
    responsive to a user utilizing the editing functionality to alter the translated string, present, in real time, an altered simulated instrumented application comprising an altered element corresponding to the alteration of the translated string.

4. The client device of claim 1, wherein the second element in the simulated instrumented application is not highlighted based upon the second element not being associated with a second editable representation.

5. The client device of claim 1, wherein the element and the second element are emphasized in the graphical user interface relative to one or more other elements displayed in the graphical user interface based upon the element and the second element being associated with translated strings and the one or more other elements being associated with strings that are not translated.

6. The client device of claim 1, the review component configured to:
    responsive to a user reviewing the second translated string, present an indication to the user that the second translated string has been reviewed.

7. The client device of claim 1, wherein the element in the simulated instrumented application is highlighted by displaying the element with a first text characteristic associated with editable representations.

8. The client device of claim 7, wherein the second element in the simulated instrumented application is not highlighted and is displayed with a second text characteristic, associated with non-editable representations, different than the first text characteristic.

9. A method of in-context translation review comprising:
    identifying a string of an element of an application;
    generating and sending, via a network connection, a request to access a translation of the string;
    in response to the request, receiving a translated string from a translator for the application;
    identifying the translated string based upon the translated string being associated with a service call instruction for the application, wherein the service call instruction comprises an instruction to integrate the translated string into the application;
    identifying, in data records, format information associated with the element;
    generating a simulated instrumented application, for testing of the application, based upon the application comprising a representation of the translated string corresponding to the format information, the simulated instrumented application comprising the element; and
    controlling a graphical user interface comprising:
        the simulated instrumented application; and
        an editable representation of the translated string visually associated with the element, wherein the element in the simulated instrumented application is highlighted by displaying the element in a first color associated with editable representations based upon the element being associated with the editable representation while one or more second elements in the simulated instrumented application are not highlighted and are displayed in one or more colors different than the first color.

10. The method of claim 9, comprising:
    responsive to a user utilizing an editing functionality to alter the translated string, presenting, in-real time, an altered simulated instrumented application comprising an altered translated string corresponding to the alteration of the translated string.

11. The method of claim 9, wherein the one or more second elements in the simulated instrumented application are not highlighted based upon the one or more second elements not being associated with second editable representations.

12. The method of claim 9, comprising:
identifying a second translated string, received from the translator for the application, based upon the second translated string being associated with a second service call instruction for the application;
generating the simulated instrumented application comprising a second element corresponding to the second translated string, the simulated instrumented application comprising the second translated string integrated into the application; and
controlling the graphical user interface comprising:
the simulated instrumented application; and
the second translated string visually associated with the second element.

13. The method of claim 12, comprising:
responsive to a user reviewing the second translated string, presenting an indication to the user that the second translated string has been reviewed.

14. The method of claim 12, comprising:
responsive to a user selecting the translated string, presenting the translated string, but not the second translated string, and the simulated instrumented application, comprising the element, in a new page.

15. The method of claim 12, comprising:
responsive to the translated string and the second translated string being reviewed, instructing an integration component to integrate the translated string and the second translated string into the application to generate a reviewed application.

16. A client device for in-context translation review, the client device comprising:
a processor;
a display; and
a memory storing instructions that, when executed on the processor, provide a review component configured to:
identify a string of an element of an application;
identify a second string of a second element of the application;
generate and send, via a network connection, a request to access a translation of the string and a second translation of the second string;
in response to the request, receive a translated string associated with the string and a second translated string associated with the second string from a translator for the application;
identify the translated string based upon the translated string being associated with a service call instruction for the application;
identify the second translated string based upon the second translated string being associated with a second service call instruction for the application;
generate an instrumented application, for testing of the application, comprising the element and the second element, the instrumented application comprising the translated string integrated into the application;
control a graphical user interface to concurrently display:
the instrumented application;
an editable representation of the translated string visually associated with the element; and
a second representation of the second translated string visually associated with the second element, wherein the editable representation is associated with an editing functionality, wherein the element in the instrumented application is highlighted based upon the element being associated with the editable representation while the second element in the instrumented application is not highlighted; and
responsive to a user utilizing the editing functionality to alter the translated string, present, in real time, an altered instrumented application comprising an altered element corresponding to the alteration of the translated string, wherein the element and the second element are emphasized in the graphical user interface relative to one or more other elements displayed in the graphical user interface based upon the element and the second element being associated with translated strings and the one or more other elements being associated with strings that are not translated.

17. The client device of claim 16, wherein the second element in the instrumented application is not highlighted based upon the second element not being associated with a second editable representation.

18. The client device of claim 16, the second representation of the second translated string different than the editable representation of the translated string.

19. The client device of claim 16, the review component configured to:
responsive to a user reviewing the second translated string, present an indication to the user that the second translated string has been reviewed.

20. The client device of claim 16, the review component configured to:
receive a request from an integration component to provide the translated string and the second translated string to be integrated into the application to generate a reviewed application; and
responsive to the translated string and the second translated string having been reviewed, provide the translated string and the second translated string to the integration component.

* * * * *